United States Patent [19]
Wilson

[11] 3,741,513
[45] June 26, 1973

[54] VEHICLE SEATS, ESPECIALLY AIRCRAFT SEATS

[75] Inventor: Anthony Ian Wilson, Leigh-on-Sea, Essex, England

[73] Assignee: Teleflex Limited, Basildon, Essex, England

[22] Filed: Nov. 19, 1971

[21] Appl. No.: 200,353

[52] U.S. Cl. ............................. 248/429, 297/346
[51] Int. Cl. ......................................... F16m 13/00
[58] Field of Search ................. 248/429, 424, 425, 248/430; 297/349, 346, 314; 244/122 R

[56] References Cited
UNITED STATES PATENTS

| | | | |
|---|---|---|---|
| 1,188,706 | 6/1916 | Wall | 248/429 |
| 2,383,173 | 8/1945 | Watter | 297/346 |
| 2,864,431 | 12/1958 | Eaton | 248/430 |
| 3,111,293 | 11/1963 | Stott et al. | 244/122 R |
| 3,259,355 | 7/1966 | Slouka | 248/430 |
| 3,313,512 | 4/1967 | Colautti et al. | 248/424 |

FOREIGN PATENTS OR APPLICATIONS

| | | | |
|---|---|---|---|
| 1,308 | 4/1926 | Australia | 248/429 |
| 534,261 | 9/1931 | Germany | 248/429 |

*Primary Examiner*—Marion Parsons, Jr.
*Attorney*—John R. Bronaugh, Floyd S. Levison et al.

[57] ABSTRACT

In a vehicle seat a mount for said seat having a base which is adapted to be positionally adjusted fore-and-aft along a track comprising three parallel equally spaced rails, roller means attached to said mount and so positioned thereon to ride on said parallel rails, said rails adjusted to support, guide and hold down said base of said seat on said rails, driving and locking means associated with said centrally disposed rail to selectively drive or lock said base on said rails, said roller means including a swivelling bogie mounted on said base, said drive means including a drive motor adapted to drive driving gear means, said driving gear means operably mounted on said swivelling bogie and adapted to mesh with corresponding rack teeth disposed on and along said centrally disposed rail, said swivelling bogie including a slipping clutch means to provide speed rundown of said drive motor, in the event said base of said vehicle seat is positionally locked on said rails.

6 Claims, 9 Drawing Figures

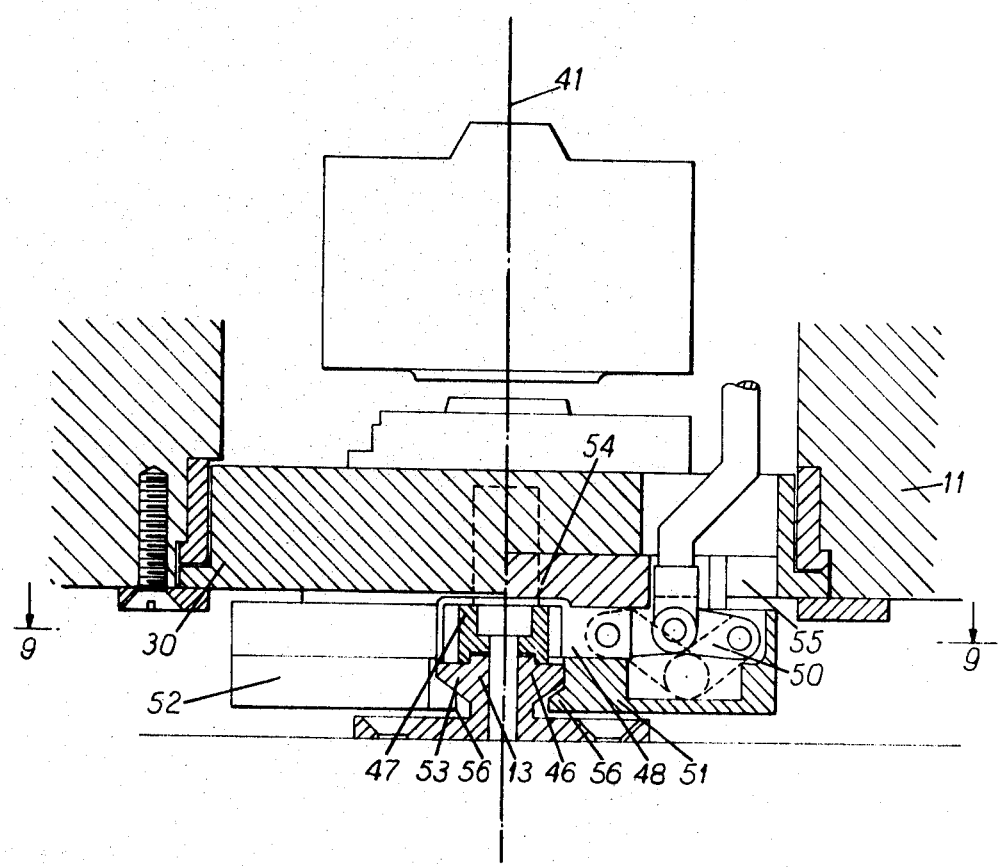

VEHICLE SEATS, ESPECIALLY AIRCRAFT SEATS

This invention relates to vehicle seats. It is concerned more particularly, but not exclusively, with seats for pilots and other aircrew members.

Aircrew members need ajustable seats and one necessary adjustment is seat travel along the aircraft floor. For this purpose aircrew seats are commonly mounted on floor rails. Sometimes thee seat track is straight but there is also a requirement for seats capable of tracking along a path that changes direction. Also, since seat adjustment often has to be effected during flight there is a need for seats that track under power instead of requiring manual adjustment.

It is therefore an object of this invention to achieve a seat construction and mounting which is a significant improvement in some or all of these respects over seats hitherto available.

According to the present invention, there is provided a vehicle seat mounted on a floor track for positional adjustment wherein the seat is equipped with mounting means giving three-point support on a three-rail track. With three-point seat support, travel of the seat along a curved track is facilitated. Preferably, two side rails act simply to give the seat support and stability while a centre rail not only provides support but also constitutes a traction and locking rail co-operating with driving and locking means on the seat frame.

In the preferred arrangement, both the driving and locking functions are performed by means of a unitary assembly in the form of a swivelling bogie mounted centrally on the seat frame. Tracking of the seat under power may be accomplished through the meshing of a drive pinion or pinions on the bogie with rack teeth along the centre rail of the floor track. Locking may be achieved by the engagement of a withdrawable toothed lock member on the bogie with the rack teeth on the rail. In this way, a seat mounting is obtained, with power drive and locking facilities, that nevertheless enables the seat to negotiate bends in the floor track quite readily.

The power drive to the swivelling bogie preferably includes a slipping clutch that will enable speed run down of the drive motor to take place in a normal manner after the seat is positively locked on its track. This clutch may be a friction clutch and a particularly advantageous feature is the incorporation of means to relieve the clutch pressure automatically and thereby, in effect, largely or entirely disengage the drive through the clutch, when a sudden rise in clutch torque indicates that the output shaft has locked. Manual disengagement of the clutch is also made possible in order that the user shall not be prevented from adjusting the seat position manually if the power drive should fail or a power supply be unavailable.

One arrangement in accordance with the invention will now be described by way of example, with reference to the accompanying drawings, in which.

Figure 3:
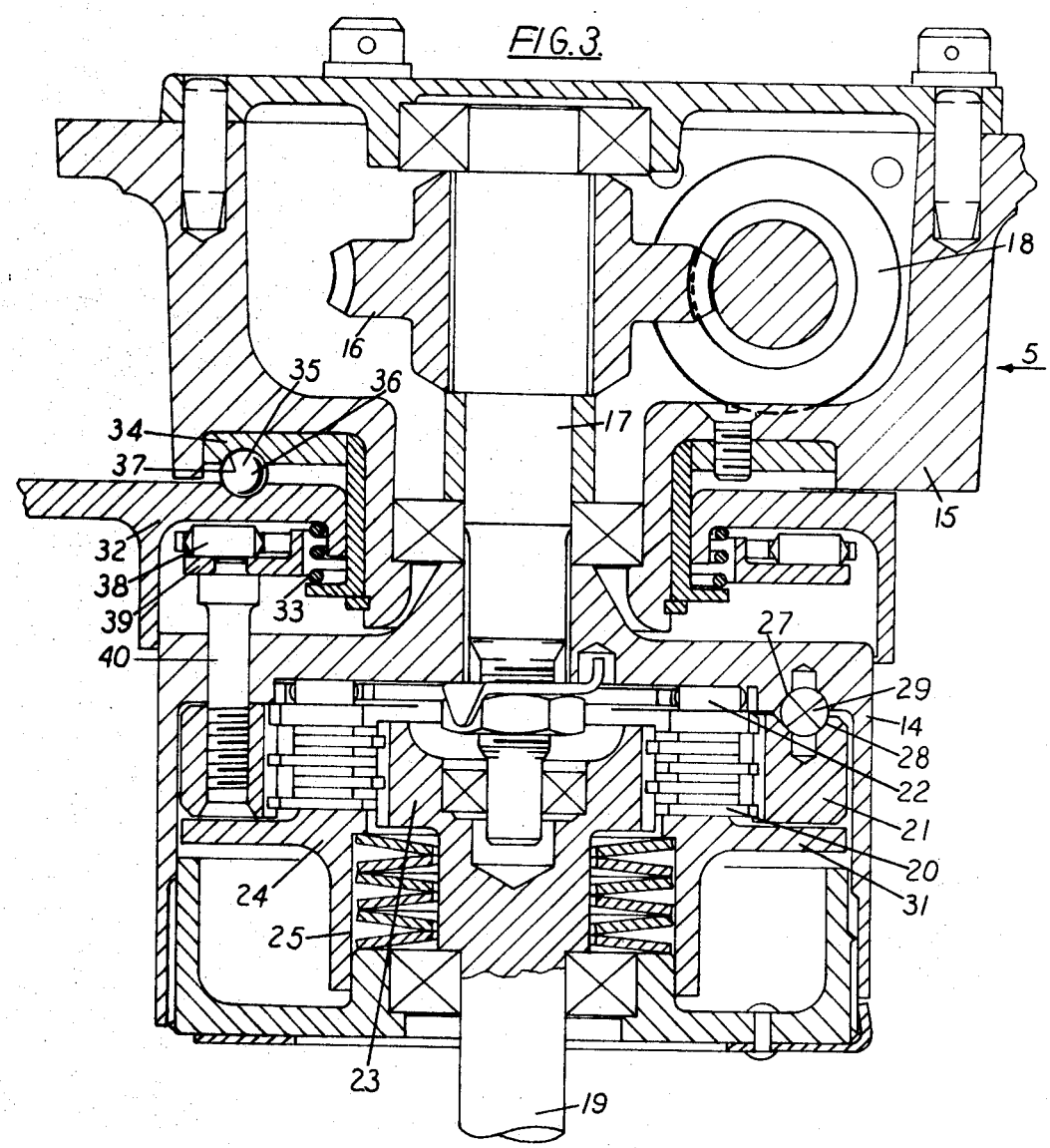
Figure 4:
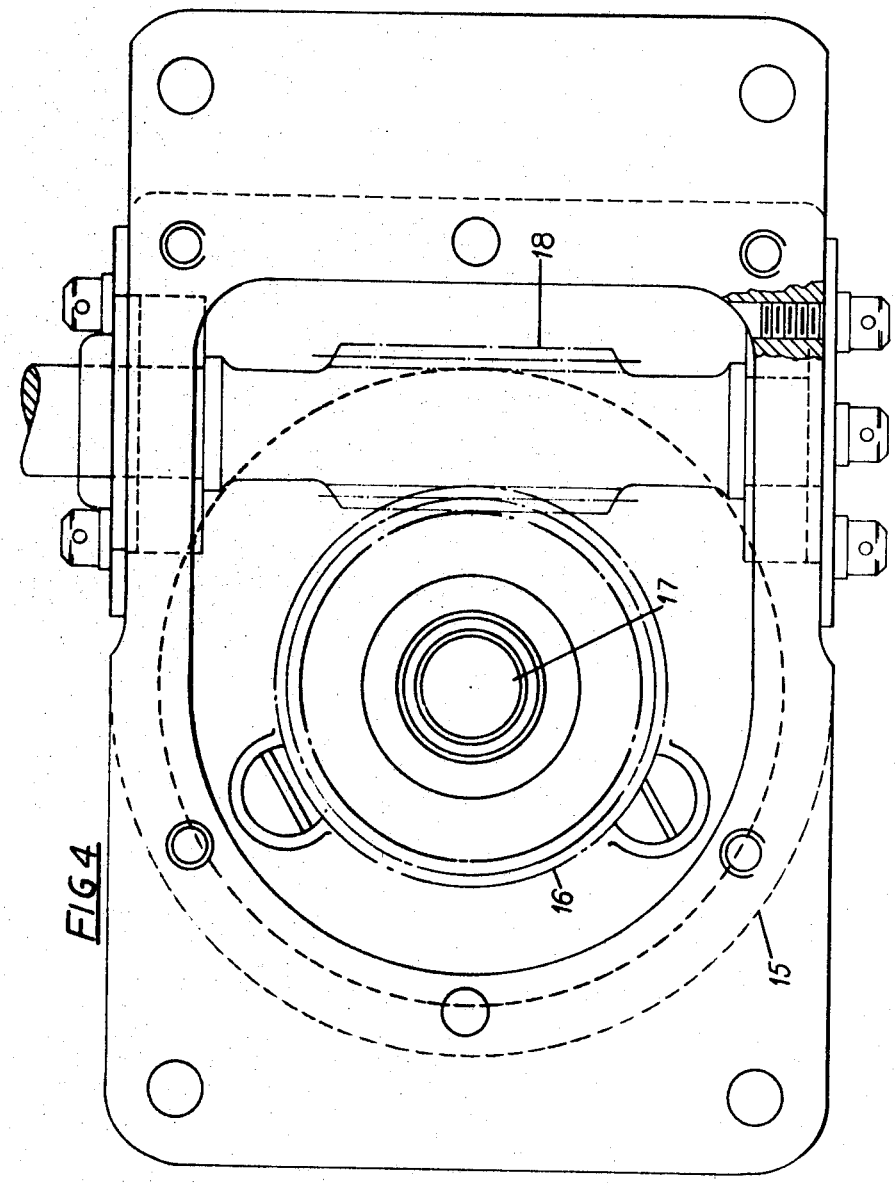
Figure 5:
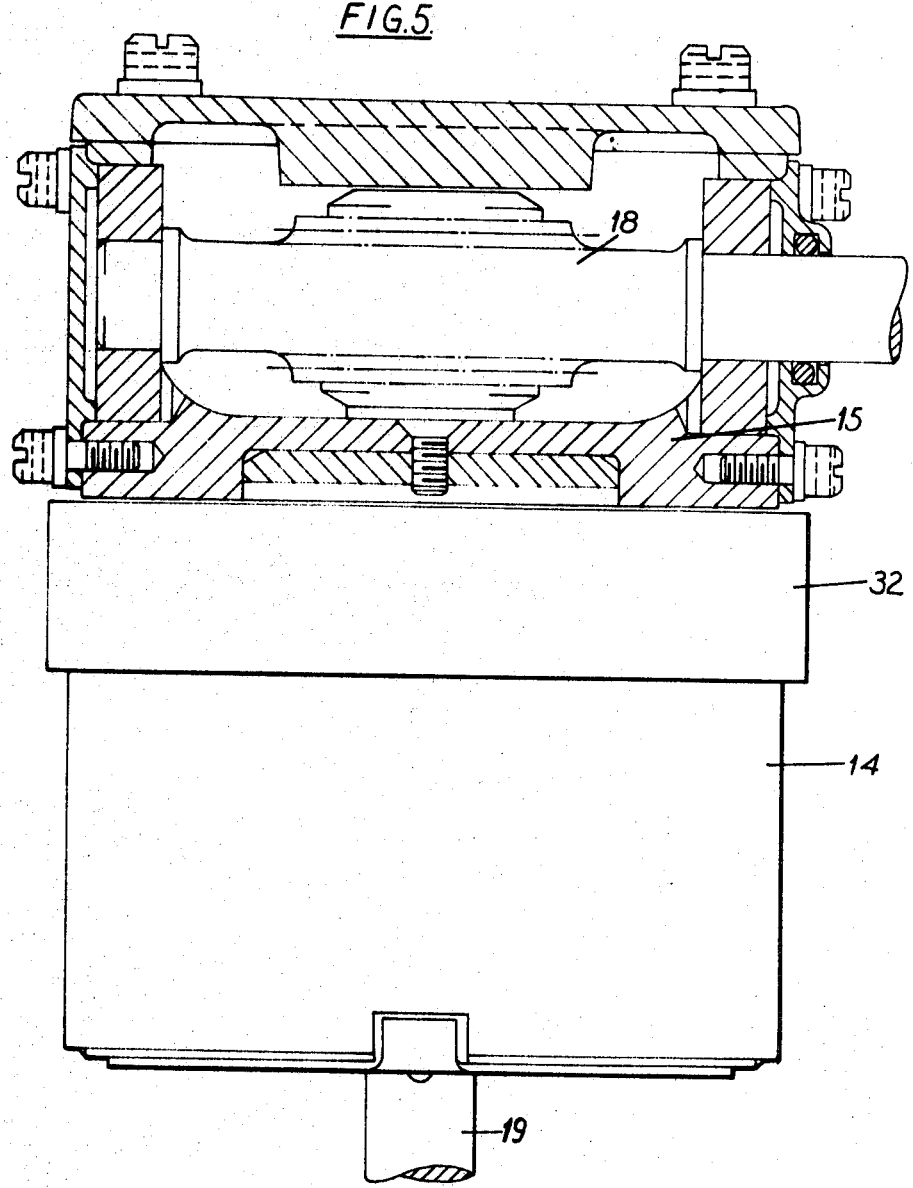
Figure 6:
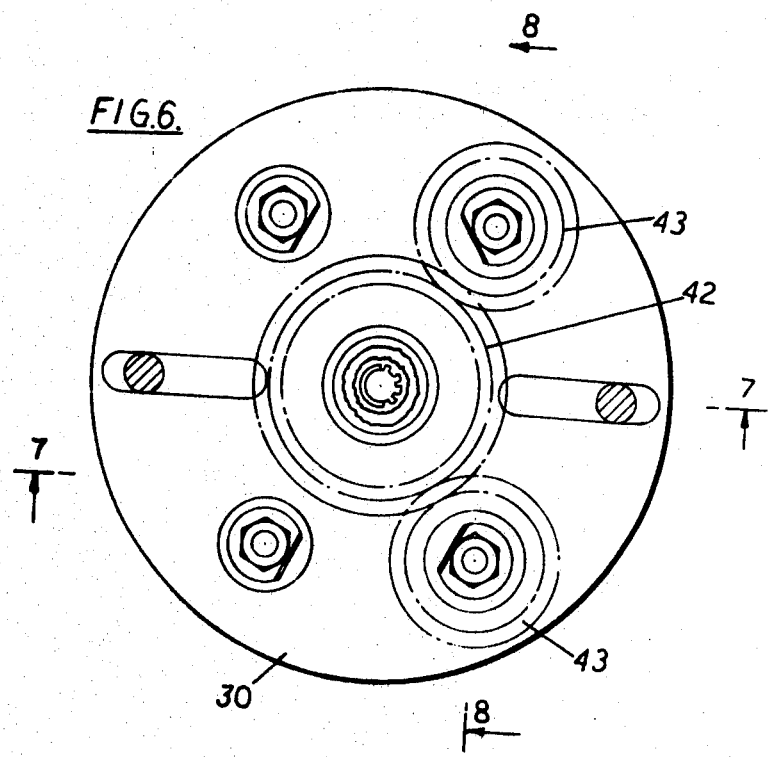
Figure 8:
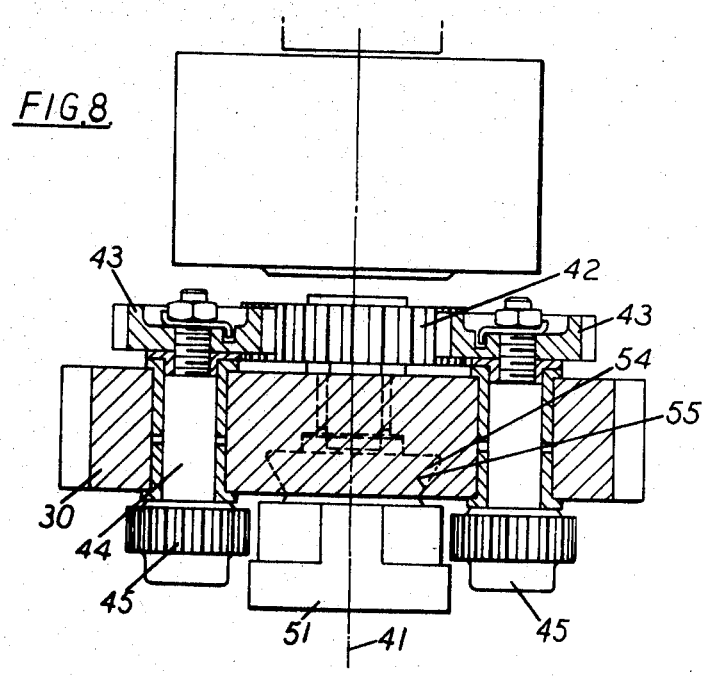
Figure 9:
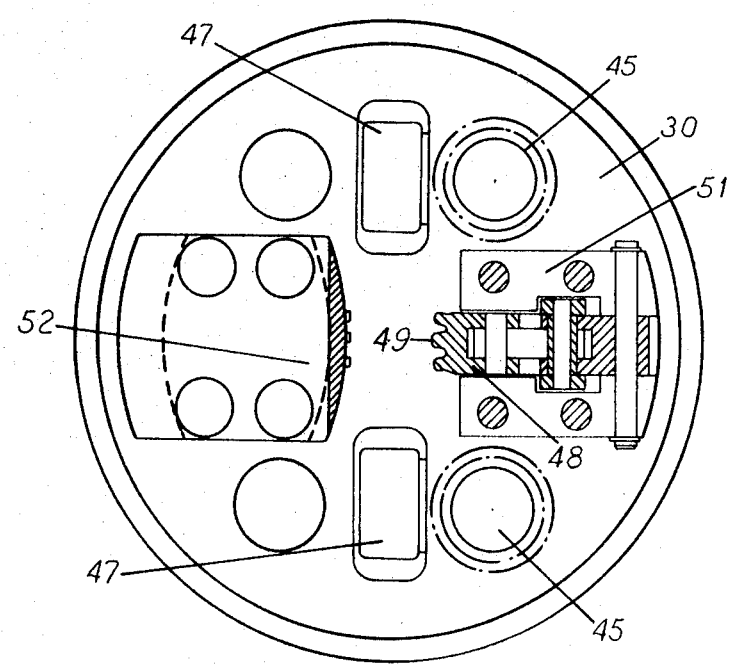

FIG. 3 is a sectional elevation of a gear and clutch unit on the seat for transmitting the motor drive to the drive bogie, FIG. 4 is a plan view of the unit of FIG. 3, FIG. 5 is a view of the unit of FIG. 3 seen in the direction of the arrow 5, FIG. 6 is a plan of the drive bogie, FIG. 7 is a view partly in section on the line 7—7 of FIG. 6, FIG. 8 is a part sectional view on the line 8—8 of FIG. 6, and FIG. 9 is a view on the line 9—9 of FIG. 7.

Figure 1:
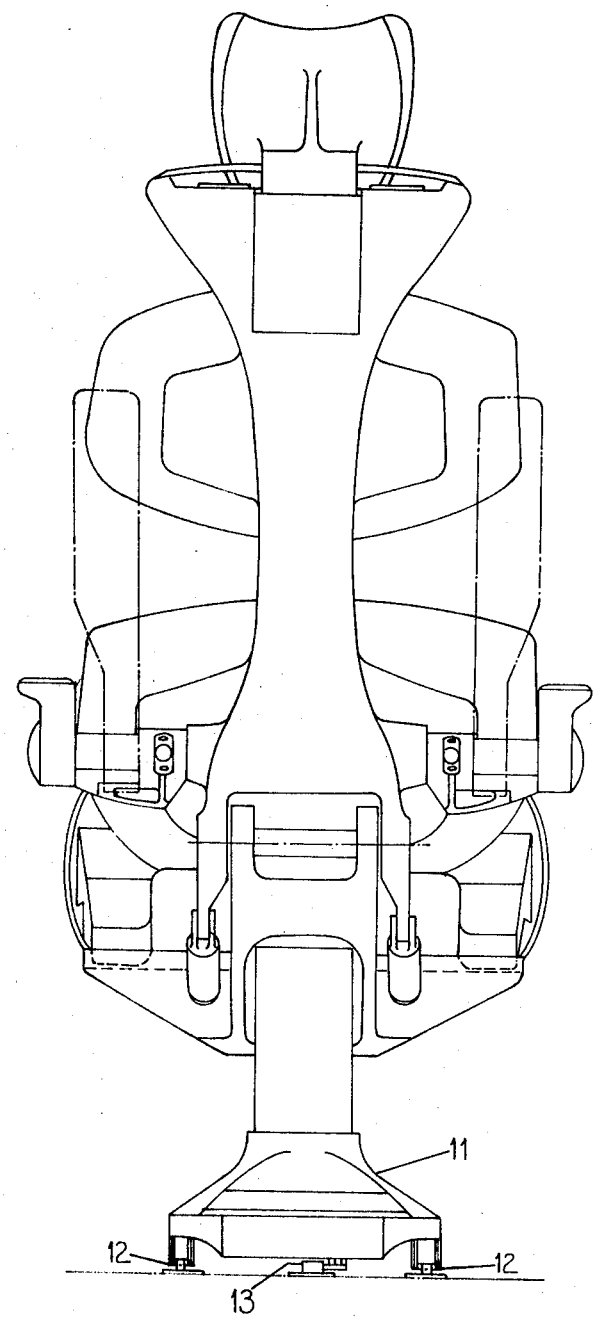
FIG. 1 shows an aircrew seat in rear elevation.
Figure 2:
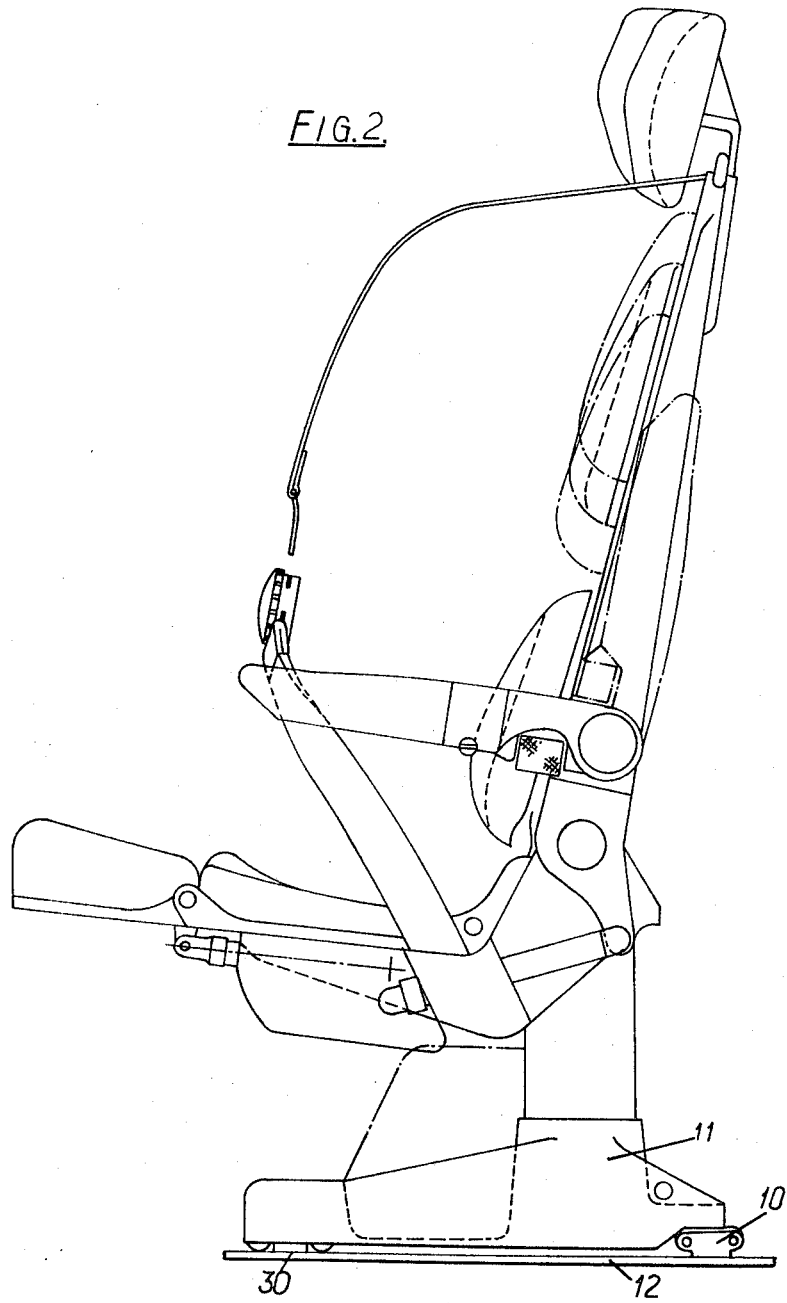
FIG. 2 is a side elevation of the seat.

FIGS. 1 and 2 of the drawings show an aircrew seat. The seat has a base 11 which is mounted for positional adjustment fore-and-aft along a floor track comprising two side rails 12 and a centre rail 13. The seat base has three-point support from two laterally-spaced rear trolleys or bogies 10 running on the side rails 12, and a central forward bogie 30 running on the centre rail. The side rails 12 merely support, guide and hold-down the seat base, but the centre rail is also a traction and locking rail that co-operates with power driving and locking means on the centre bogie on thee front of the seat base. The drive bogie 30 is shown in FIGS. 6 to 9 of the drawings; and a clutch unit for transmitting power drive to the bogie is shown in FIGS. 3 to 5.

Referring now to FIGS. 3 to 5, the clutch has a rotary clutch housing 14 above which is a non-rotary gear case 15. A worm wheel 16 disposed centrally in the gear case on a vertical shaft 17 is in mesh with a horizontal worm 18 that is driven by an electric motor (not shown). The shaft 17 depends into and drives the rotary clutch housing 14 which in turn drives a further shaft 19, in alignment with the shaft 17, through a friction disc assembly 20. The driving member of the friction disc assembly 20 is a ring 21 surrounding the annular friction discs. A roller thrust bearing 22 is interposed between the friction disc assembly and the upper wall of the clutch housing. The driven clutch member 23, surrounded by the annular friction disc assembly 20, is constituted by an enlarged head on the upper end of the shaft 19, which shaft passes out downwardly through the lever wall of the clutch housing. The annular friction discs of the clutch are urged into engagement by a flanged ring 24 which encircles the shaft 19 and is pressed up toward the clutch discs by a set of disc springs 25 also encircling the shaft 19.

When the clutch is transmitting power normally to the output shaft 19 the clutch housing 14 rotates as one with both shafts. The driving clutch ring 21 encircling the clutch discs is itself driven by the clutch housing through a set of balls 27 lodged in recesses 28, 29 in the ring and the clutch housing wall, respectively. Upon the output shaft 19 becoming locked against rotation, which occurs when the seat is locked to the rail 13 as hereinafter described, the increased clutch torque causes the balls 27 to be cammed out of their recesses 28, 29, which taper in opposite directions of rotation, by limited relative angular movement of the clutch housing and the driving ring 21. The ring 21 is consequently urged downward against the radial flange 31 of the flanged ring 24 and thereby relieves the pressure on the clutch friction disc assembly 20 by movement downward of the ring 24 against the action of the disc spring 25. This effectively disengages the drive from the shaft 19 and allows the drive motor to lose speed progressively even although the shaft 19 is already locked. When the seat is unlocked and the drive motor is restarted, relative rotation of the clutch housing and driving ring 21 occur until the balls 27 re-engage in their recesses 28, 29.

For effecting manual disengagement of the clutch, so that the seat position can be shifted manually if the drive should fail or no power supply be available, a collar 32 surrounds a necked lower portion of the gear case 15 and is angularly movable manually. This collar is urged up by a spring 33 toward a non-rotary plate 34 fixed to the gear case, and a set of balls 35 is accomodated in recesses 36, 37 provided respectively in the collar 32 and the plate 34. These recesses taper in opposite directions, like the recesses 28, 29, so that when the collar is moved angularly it is cammed downward against the action of the spring 33. This brings it into engagement with a roller thrust bearing 38 on a rotary carrier 39 that rotates with the clutch housing, the carrier 38 being borne above the clutch housing by a set of bolts 40 passing slidably through the top wall of the clutch housing and into the driving ring 21. The downward movement of the collar 32 in turn causes downward movement of the assembly comprising the roller bearing 38 the carrier 39 and the bolts 40, and therefore the bolts carry down the driving ring 21 to force down the flanged ring 24 as before and the clutch is disengaged. To enable the aforesaid limited relative rotation of the driving ring 21 and clutch housing to take place and bring about disengagement of the clutch when the unit is running under power, the holes in the top wall of the clutch housing through which the bolts 40 pass are formed as slots.

Turning now to FIGS. 6 to 9 of the drawings, the front centre drive bogie 30 is mounted in the seat base 11 for swivelling about the axis 41 of the clutch unit which lies above it. The output shaft 19 of the clutch unit drives a central gear 42 on the bogie which is in mesh with two off-set pinions 43 that are carried by shafts 44 extending vertically through to the underside of the bogie. Two further pinions 45 on the lower ends of the shafts 44 are in mesh with the teeth of a continuous rack bar 46 secured along the top of the centre floor rail 13, thereby to accomplish the power tracking of the seat. The bogie runs on the rack bar on a pair of rollers 47 disposed in tandem, and two pinions 45 engage the rack bar at positions on the same side of the rail, and mutually displaced along it, that are laterally opposite, respectively, the two rollers 47.

Between the two pinions 45, on the same side of the rail, there is provided a withdrawable locking member 48 has teeth 49 to engage the rack bar teeth and a toggle-type linkage 50 for shifting it into and out of engagement. The locking member 48 slides in a shoe 51 which is united with another shoe 52 on the opposite side of the rail by cross-head 54 sliding transversely in a guide 55 in the main body of the bogie 30. The complete shoe assembly and locking mechanism is thus above to slide horizontally in the direction at right angles to the rail as the bogie travels, which feature enables the locking mechanism to negotiate curved rails. The rail 13 has an undercut head 53 and the two shoes 51, 52 contact opposite sides of this head and have projecting portions 56 engaging underneath it to hold down the seat.

What we claim is:

1. In a vehicle seat a mount for said seat having a base which is adapted to be positionally adjusted fore-and-aft along a track comprising three parallel equally spaced rails, roller means attached to said mount and so positioned thereon to ride on said parallel rails, said rails adjusted to support, guide and hold down said base of said seat on said rails, driving a locking means associaated with said centrally disposed rail to selectively drive or lock said base on said rails, said roller means including a swivelling bogie mounted on said base, said drive means including a drive motor adapted to drive driving gear means, said driving gear means operably mounted on said swivelling bogie and adapted to mesh with corresponding rack teeth disposed on and along said centrally disposed rail, said swivelling bogie including a slipping clutch means to provide speed rundown of said drive motor, in the event said base of said vehicle seat is positionally locked on said rails.

2. A mount for a vehicle seat having a base in accordance with claim 1 wherein said clutch is a friction type clutch and the clutch pressure is relieved automatically where there is a rapid application of clutch torque which is indicative of a locked condition of the output shaft of said clutch means.

3. A mount for a vehicle seat having a base in accordance with claim 1 wherein means further provided for manual disengagement of said clutch means and said clutch means includes friction discs, said drive motor is operably connected to said set of friction discs by means of a rotary driving and driven members spring biased toward one another and having mutually adjacent opposed radial faces with balls interposed between them which balls are lodged in oppositely tapering recesses in the two faces, whereby when the condition of maximum torque is reached said driving and driven members are cammed axially away from one another by the balls riding partially out of the recesses, to disengage said clutch discs.

4. A mount for a vehicle seat having a base in accordance with claim 3 wherein said manual disengagement means includes cam means operably positioned to relieve the force tending to engage said clutch discs, said clutch means having an output shaft in alignment with the central axis of said swivelling bogie, a central gear on said bogie being driven by said output shaft, said output shaft driving at least two pinions in engagement with said rack teeth on said central rail, said pinion lying fore-to-aft of the central axis of said swivelling bogie, both of said pinions being on the same side of said rail.

5. A mount for a vehicle seat having a base in accordance with claim 3 wherein a lock member is disposed midway between said two drive pinions in transverse alignment with the central axis of the bogie, said swivelling bogie having two rollers arranged in tandum each in transverse alignment with a respective one of said two drive pinions.

6. A mount for a vehicle seat having a base in accordance with claim 22 wherein said lock members are slidably mounted in one of a pair of opposed shoes on opposite sides of said central rail, said shoes being connected by a crosshead traveling above the rail, said crosshead adapted to slide horizontally on said swivelling bogie in a direction in relation to said central rail so as to enable said opposed shoes and lock member to negotiate curvatures in said rails, said shoes having projections that underly the head of the rail so as to provide a movable holddown connection with said rail.

* * * * *

UNITED STATES PATENT OFFICE
CERTIFICATE OF CORRECTION

Patent No. 3,741,513          Dated June 26, 1973

Inventor(s)   Anthony Ian Wilson

It is certified that error appears in the above-identified patent and that said Letters Patent are hereby corrected as shown below:

Column 2, line numbered 36, change "lever" to --lower--.

Column 3, line numbered 51, change "above" to --able--.

Column 4, line numbered 42, change "fore-to-aft" to --fore-and-aft--.
line numbered 54, change "22" to --5--.

Signed and sealed this 20th day of August 1974.

(SEAL)
Attest:

McCOY M. GIBSON, JR.
Attesting Officer

C. MARSHALL DANN
Commissioner of Patents